Figure 1:
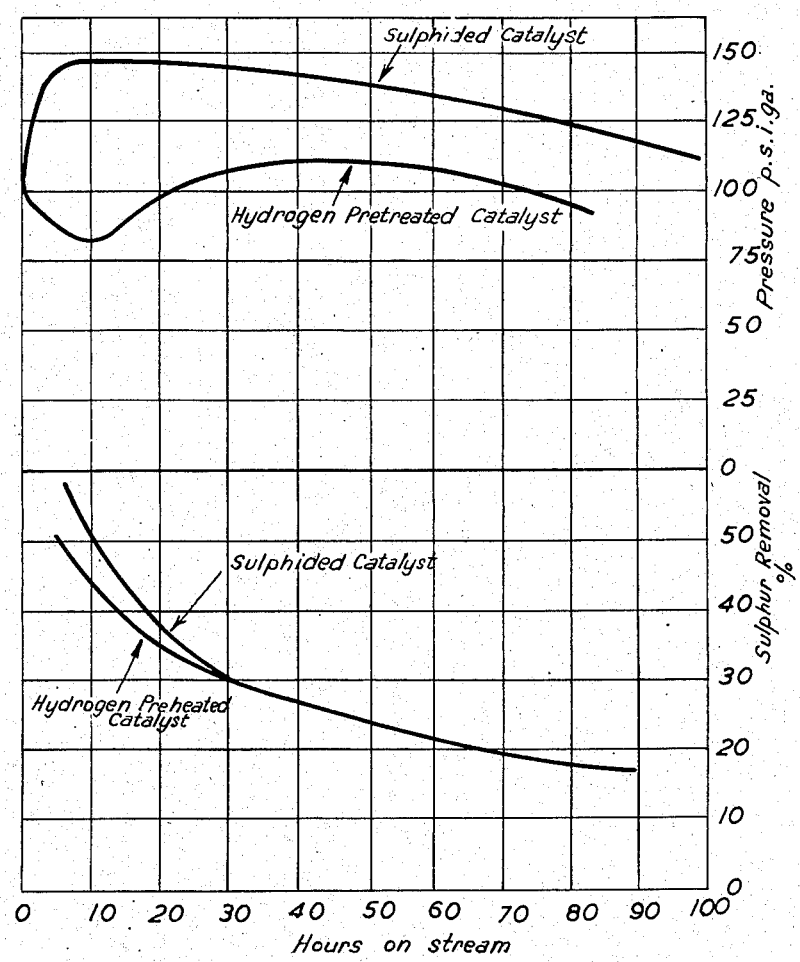

Oct. 20, 1953     F. W. B. PORTER ET AL     2,656,302
CATALYTIC DESULFURIZATION OF PETROLEUM HYDROCARBONS
Filed Sept. 20, 1950     2 Sheets-Sheet 1

Inventors
Frederick William Bertram Porter
and John Norman Haresnape
By
Morgan, Finnegan & Durham
Attorney

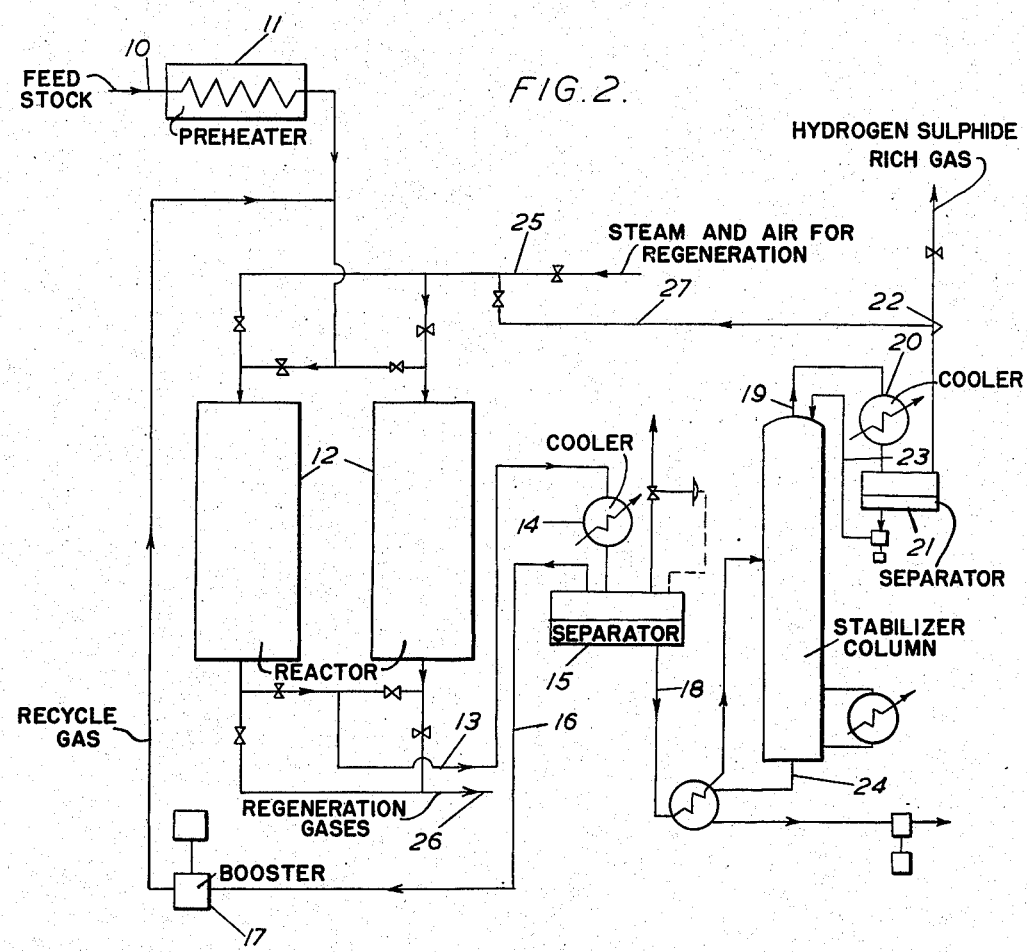

Patented Oct. 20, 1953

2,656,302

UNITED STATES PATENT OFFICE 2,656,302

CATALYTIC DESULFURIZATION OF PETROLEUM HYDROCARBONS

Frederick William Bertram Porter and John Norman Haresnape, Sunbury-on-Thames, England, assignors to Anglo-Iranian Oil Company Limited, London, England, a British joint-stock corporation Application September 20, 1950, Serial No. 185,704
In Great Britain September 22, 1949

5 Claims. (Cl. 196—28)

This invention relates to the catalytic desulphurisation of petroleum hydrocarbons.

In the specifications of co-pending applications Nos. 35,976; 46,502 (now Patent No. 2,574,445); 68,416 (now Patent No. 2,574,446); 100,538 (now Patent No. 2,574,448); and 94,262 (now Patent No. 2,574,447) there are described processes for the catalytic desulphurisation of petroleum fractions ranging from light distillates, such as light naphtha, to heavy distillates, such as wax distillate, wherein the feedstock is passed to a catalytic desulphurisation zone wherein it is treated in the presence of a sulphur-resistant hydrogenation catalyst, as specified, under conditions of temperature and pressure such that sufficient hydrogen is produced by dehydrogenation of naphthene hydrocarbons contained in the feedstock to effect the conversion of sulphur compounds contained in the feedstock into hydrogen sulphide and to provide a hydrogen-rich gaseous fraction which is recycled to the catalytic desulphurisation zone in order to maintain the necessary partial pressure of hydrogen therein. Broadly, the basic autofining process outlined in the aforementioned applications and patents is operated by maintaining a selected temperature in the reaction zone between about 650° F. to about 800° F. at which hydrogen is continuously produced from the product and a selected pressure is maintained in the reaction zone between about 25 to about 250 lbs./sq. in. gauge. The selected temperature and pressure are correlated to provide, from the dehydrogenation of the naphthenes contained in the product, a net production of hydrogen at least sufficient to convert organic compounds present in the product to hydrogen sulphide. Such processes are carried out without the use of extraneous hydrogen and it is convenient to designate such processes as autofining processes to distinguish them from similar catalytic desulphurisation processes carried out with the aid of extraneous hydrogen, the latter processes being commonly called hydrofining processes.

In the specification of co-pending application Serial No. 153,339 filed April 1, 1950 a further development of the autofining process was described in which, instead of setting the pressure in the autofining zone at a predetermined level and thereafter withdrawing from the system gas in excess of that required to maintain the predetermined pressure, the whole of the hydrogen-containing gaseous fraction separated from the products of the autofining zone is recycled to said zone and the pressure therein allowed to rise to an equilibrium pressure at which the hydrogen evolved equals the hydrogen consumed. Under these equilibrium process conditions a greater degree of desulphurisation is achieved, the on-stream hours for a product of given sulphur content are increased and the hydrogen produced in the hydrogenation reaction is fully utilised in the desulphurisation reaction.

In carrying out the autofining process, the preferred catalyst is of the so-called cobalt molybdate type which consists of the oxides of cobalt and molybdenum deposited on or incorporated with a support, preferably alumina. The unit is normally pressured up to operating pressure and gas recycle commenced, so as to bring the catalyst up to the operating temperature. To carry out this pretreatment requires the provision of a considerable amount of hydrogen (of the order of 64 cu. ft. per cu. ft. of catalyst) which is used up by partial reduction of the catalyst and by sorption on the catalyst itself. The hydrogen can be obtained from the process provided adequate storage factilities are provided.

Furthermore, it has been found that there is a period at the commencement of each run during which the gas make is negligible or non-existent and the desulphurisation is not at its maximum. This low dehydrogenating activity of the catalyst is more noticeable at low feedstock velocities and with the heavier type of feedstock.

It has now been discovered that the autofining process may be operated in a manner which gives increased dehydrogenation and desulphurisation during the early hours on stream and which consumes considerably less hydrogen than hitherto for the purpose of pretreating the catalyst.

According to the invention, the autofining process for the catalytic desulphurisation of a petroleum distillate, is carried out using a catalyst consisting of the combined oxides of cobalt and molybdenum deposited on or incorporated with a support, said catalyst having previously been subjected to treatment with hydrogen sulphide or hydrogen sulphide-containing gases.

The hydrogen sulphide used for the pre-treatment of the catalyst may consist of substantially pure hydrogen sulphide but may more conveniently consist of hydrogen sulphide-containing gases available from the autofining process. Thus, in the autofining process, the treated distillate is first cooled at plant pressure to separate the recycle gas containing a high proportion of hydrogen and a small proportion of H₂S and the product thereafter stabilised by being reduced to atmospheric pressure to release the remainder of the hydrogen and the bulk of the H₂S together with a proportion of light hydrocarbons. This stabiliser gas may contain approximately 50% H₂S and is suitable as such for use in treating the catalyst according to the present invention, or if desired, the H₂S may be recovered from the stabiliser gas and used in substantially pure form.

In applying the autofining process to gas oils and heavier fractions, two or more reactors are employed in order to provide for continuous operation, and in such method of operation it may be convenient to carry out the pretreatment of the catalyst by passing stabiliser gas direct from the stabiliser through a reactor immediately after the regenerating stage while the catalyst is still hot. Alternatively, the stabiliser gases may be collected under pressure and recycled as desired.

The application of the process of the invention to an autofining system incorporating two reactors will now be described with reference to Figure 1 of the accompanying drawings.

The feed is introduced through line 10 and after passing through the preheater 11 enters one of the reactors 12 maintained under autofining conditions of temperature and pressure. The product from the reactor passes via line 13 to the cooler 14 wherein it is cooled under reactor pressure and the liquified product passed to a separator 15 from which a recycle gas containing a high proportion of hydrogen is removed via line 16 and fed by means of the booster 17 into admixture with the preheated feed to the reactor. The liquefied product from the separator 15, still containing the bulk of the hydrogen sulphide in solution, is passed via line 18 to a stabiliser column 19. The overhead gas from the column 19 is passed via cooler 20 to a separator 21 from which hydrogen sulphide rich gas is removed via line 22 and vented, while liquid from the separator 21 is returned via line 23 as reflux to the top of the column. Hydrogen sulphide free product is removed from the base of the column 19 via line 24.

While one reactor 12 is on stream, the other reactor 12 is being regenerated, for which purpose a mixture of steam and air is admitted via line 25, the regeneration gases leaving via line 26. In accordance with the process of the invention, immediately after the regeneration of a reactor 12 is completed and while the catalyst is still hot, hydrogen sulphide rich gas is passed through the reactor via lines 25 and 27 and leaves through line 26. After the treatment of the regenerated catalyst with the hydrogen sulphide rich gas has continued for a suitable time, the reactor is ready to be brought on stream again.

The autofining of a wax distillate by the process of the invention will now be described by way of example with reference to the accompanying graph, Figure 2.

A wax distillate consisting of the fraction distilled over between 55.7–86.1% volume on an Iranian crude oil and having a sulphur content of 1.74% wt. was subjected to two separate autofining operations under the following operating conditions:

Catalyst _____ Cobalt molybdate on alumina.
Temperature _____ 750° F.
Space velocity ____ 0.5 v/v/hr.
Gas recycle rate__ 4000 CF/B at 100 p. s. i. g.

Both operations were carried out under equilibrium process conditions, i. e. the unit was shut in and allowed to find its own pressure level.

In the first operation the reactor was pressured up to 100 p. s. i. g. and given the usual hydrogen pretreatment for half an hour before commencing the feed. The second operation was carried out using the regenerated catalyst from the first operation. After the regeneration stage, the reactor was allowed to cool down to 400–500° F. and hydrogen sulphide gas was recycled at 100 p. s. i. g. pressure. After half an hour, the pressure had dropped to a steady 10 p. s. i. g. The unit was then depressurised and repressured with hydrogen to 100 p. s. i. g. After bringing the temperature up to the operating temperature, during which period no hydrogen was consumed, the feed was commenced.

By reference to the accompanying graph, it will be seen that using the hydrogen preheated catalyst, the pressure in the reactor fell for the first ten hours and did not reach equilibrium pressure until 40 hours had elapsed. The desulphurisation after 10 hours on stream was about 44%. Using the presulphided catalyst, the pressure built up immediately and reached equilibrium pressure after 8–9 hours. After 10 hours on stream the desulphurisation was over 50%.

We claim:
1. In a continuous process for the hydrocatalytic desulphurization of a sulphur-and-naphthene-containing hydrocarbon oil wherein the oil is contacted in a reaction zone at an elevated temperature and pressure in the presence of hydrogen with a dehydrogenation-hydrogenation catalyst which has been pretreated with hydrogen sulphide and which is immune to sulphur poisoning and combining activity for the dehydrogenation of naphthenes in said oil to aromatics with activity for the hydrogenation of organically combined sulphur in the oil to hydrogen sulphide, the method of operating the process so that it will be self-supporting with respect to the amount of hydrogen needed and give increased dehydrogenation and desulphurization during the early hours on stream and consume considerably less hydrogen than heretofore required for the purpose of pretreating the catalyst and produce a desulphurized oil; comprising the steps of passing the hydrocarbon oil to be treated through said reaction zone and contacting the oil therein with hydrogen derived solely from the oil and with said catalyst which has been pretreated with hydrogen sulphide derived solely from the oil, said conditions of elevated temperature and pressure being such that sufficient hydrogen is produced by dehydrogenation of naphthene hydrocarbons contained in the oil to effect the conversion of sulphur compounds contained in the oil into hydrogen sulphide and to provide a hydrogen-rich gaseous mixture which is recycled to the catalytic desulphurization zone in order to maintain the necessary partial pressure of hydrogen therein; passing the desulphurized oil to a gas separation stage maintained under the desulphurization pressure but reduced temperature, separating a hydrogen-rich gas mixture, and leaving a liquid product containing the bulk of the hydrogen-sulphide obtained from the reaction in solution, recycling said hydrogen-rich gas mixture to the reaction zone to constitute the whole of the hydrogen supplied to said zone, passing said hydrogen-sulphide-containing liquid product to a stabilizing stage for the separation of a hydrogen-sulphide-rich gas, separately regenerating catalyst for use in said process, and passing said hydrogen-sulphide-rich gas back to the regenerating system for treating the catalyst in said regenerating system just after it has been regenerated.

2. A process in accordance with claim 1 wherein the catalyst consists of the combined oxides of cobalt and molybdenum.

3. A process in accordance with claim 1 wherein the operating temperature is a selected temperature between about 650° F. to about 800° F. at which hydrogen is continuously produced from the oil and a selected pressure between about 25 to about 250 lbs./sq. in. gauge is maintained in said reaction zone, said selected temperature and pressure being correlated to provide, from the dehydrogenation of naphthenes contained in said oil, a net production of hydrogen at least sufficient to convert organic sulphur compounds in said oil to hydrogen sulphide.

4. A process in accordance with claim 1 in which treatment of the oil with said catalyst is carried out at a selected temperature within the range of about 650° F. to about 800° F. and at equilibrium pressure.

5. A process in accordance with claim 1 in which after a determined period of time the treatment of said oil is transferred to and continued in a second catalytic desulphurization zone, the spent catalyst in said first zone being regenerated in situ, and while the regenerated catalyst is still hot, pretreating the regenerated catalyst with hydrogen sulphide separated from the treated oil from said second zone, discontinuing the pretreating operation, bringing the hydrogen sulphide treated catalyst up from the pretreating temperature to the operating temperature in an atmosphere of hydrogen, and employing the regenerated and pretreated catalyst for the treatment of further quantities of said oil.

FREDERICK WILLIAM BERTRAM PORTER.
JOHN NORMAN HARESNAPE.

References Cited in the file of this patent

UNITED STATES PATENTS

| Number | Name | Date |
|---|---|---|
| 2,105,665 | Lazier et al. | Jan. 18, 1938 |
| 2,131,089 | Beeck et al. | Sept. 27, 1938 |
| 2,325,033 | Byrns | July 27, 1943 |
| 2,431,920 | Cole | Dec. 2, 1947 |
| 2,567,252 | Strang | Sept. 11, 1951 |
| 2,574,445 | Porter et al. | Nov. 6, 1951 |